United States Patent
Miyata

(10) Patent No.: US 12,115,503 B2
(45) Date of Patent: Oct. 15, 2024

(54) HOLLOW-FIBER MEMBRANE

(71) Applicant: SUMITOMO ELECTRIC INDUSTRIES, LTD., Osaka (JP)

(72) Inventor: Hiroki Miyata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 232 days.

(21) Appl. No.: 17/275,380

(22) PCT Filed: Aug. 7, 2019

(86) PCT No.: PCT/JP2019/031018
§ 371 (c)(1),
(2) Date: Mar. 11, 2021

(87) PCT Pub. No.: WO2020/059344
PCT Pub. Date: Mar. 26, 2020

(65) Prior Publication Data
US 2022/0054987 A1 Feb. 24, 2022

(30) Foreign Application Priority Data
Sep. 20, 2018 (JP) .................. 2018-175905

(51) Int. Cl.
*B01D 69/08* (2006.01)
*B01D 69/02* (2006.01)
*B01D 71/36* (2006.01)

(52) U.S. Cl.
CPC ............. *B01D 69/08* (2013.01); *B01D 69/02* (2013.01); *B01D 71/36* (2013.01); *B01D 2325/0283* (2022.08)

(58) Field of Classification Search
CPC ........ B01D 2325/02; B01D 2325/0214; B01D 2325/022; B01D 2325/0231;
(Continued)

(56) References Cited

U.S. PATENT DOCUMENTS 4,604,326 A    8/1986  Manabe et al.
4,919,810 A *  4/1990  Itoh ...................... B01D 69/06
                                              428/521
(Continued)

FOREIGN PATENT DOCUMENTS

CN   202129031 U  *  2/2012
CN   102941025 A  *  2/2013
(Continued)

OTHER PUBLICATIONS

CN102941025A—EPO Machine Translation (Year: 2023).*

*Primary Examiner* — Patrick Orme
(74) *Attorney, Agent, or Firm* — Faegre Drinker Biddle & Reath LLP

(57) ABSTRACT

A hollow-fiber membrane according to an aspect of the present disclosure includes a porous, tubular filtration layer containing polytetrafluoroethylene as a main component and having a fibrous skeleton. A mean pore diameter in an outer peripheral surface of the filtration layer is smaller than a mean pore diameter in an inner peripheral surface of the filtration layer. A ratio of the mean pore diameter in the inner peripheral surface to the mean pore diameter in the outer peripheral surface is 2.0 or more and 5.0 or less.

6 Claims, 7 Drawing Sheets

(58) Field of Classification Search
CPC ........................ B01D 2325/0233; B01D 71/36; B01D 39/16; B01D 67/0027; B01D 69/02; B01D 69/08
See application file for complete search history.

(56) References Cited

U.S. PATENT DOCUMENTS

| | | | |
|---|---|---|---|
| 2009/0297822 A1* | 12/2009 | Fujimura | ............ B01D 69/088 428/314.2 |
| 2012/0160764 A1 | 6/2012 | Tada et al. | |
| 2018/0169590 A1 | 6/2018 | Yabuno et al. | |
| 2019/0076790 A1* | 3/2019 | Sakakibara | ................ C08J 9/26 |

FOREIGN PATENT DOCUMENTS

| | | |
|---|---|---|
| CN | 103394297 A | 11/2013 |
| JP | S59-204911 A | 11/1984 |
| JP | 2009-226338 A | 10/2009 |
| JP | 2010-042329 A | 2/2010 |
| JP | 2011-74367 A | 4/2011 |
| JP | 2018-102423 A | 7/2018 |
| WO | WO-2007/043553 A1 | 4/2007 |
| WO | WO-2010/029908 A1 | 3/2010 |
| WO | WO-2015/041286 A1 | 3/2015 |
| WO | WO-2015/146469 A1 | 10/2015 |
| WO | WO-2017/155034 A1 | 9/2017 |

* cited by examiner

50 μm
X

50 μm
X

HOLLOW-FIBER MEMBRANE

TECHNICAL FIELD

The present disclosure relates to a hollow-fiber membrane.

The present application claims priority from Japanese Patent Application No. 2018-175905 filed on Sep. 20, 2018, and the entire contents of the Japanese patent application are incorporated herein by reference.

BACKGROUND ART

Hollow-fiber membranes for solid-liquid separation in sewage treatment or a process for producing a medicine or the like are known. Examples of the hollow-fiber membranes include inorganic membranes and organic membranes. The organic membranes are advantageous in that, for example, they have higher water permeability than the inorganic membranes and that the production cost and operating cost of the whole apparatus are easily reduced. An example of such an organic membrane that has been proposed is an organic membrane containing, as a main component, polytetrafluoroethylene, which is excellent in terms of, for example, mechanical strength, flexibility, and chemical resistance (refer to Japanese Unexamined Patent Application Publication No. 2010-42329).

CITATION LIST

Patent Literature

PTL 1: Japanese Unexamined Patent Application Publication No. 2010-42329

SUMMARY OF INVENTION

A hollow-fiber membrane according to an aspect of the present disclosure includes a porous, tubular filtration layer containing polytetrafluoroethylene as a main component and having a fibrous skeleton, in which a mean pore diameter in an outer peripheral surface of the filtration layer is smaller than a mean pore diameter in an inner peripheral surface of the filtration layer, and a ratio of the mean pore diameter in the inner peripheral surface of the filtration layer to the mean pore diameter in the outer peripheral surface of the filtration layer is 2.0 or more and 5.0 or less.

DESCRIPTION OF EMBODIMENTS

Figure 1:
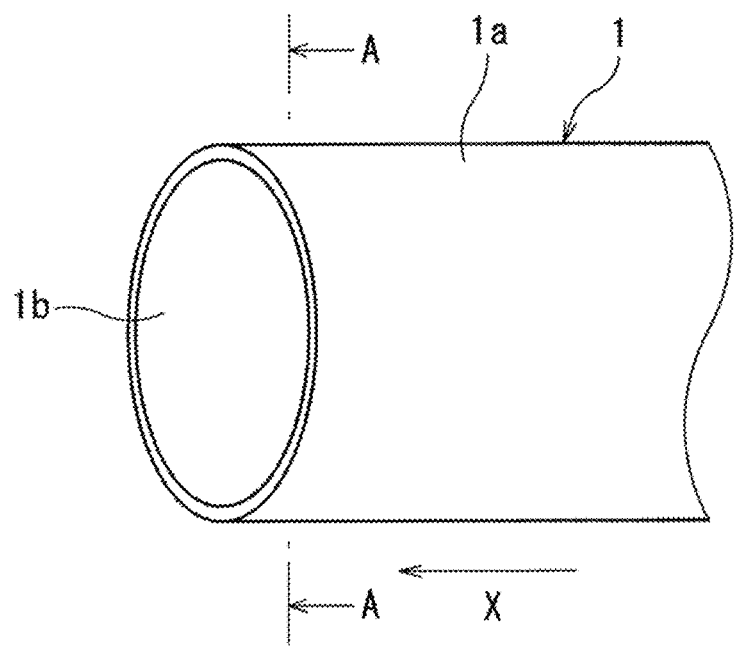
FIG. 1 is a schematic perspective view illustrating a hollow-fiber membrane according to an embodiment of the present disclosure.

Problems to be Solved by Present Disclosure

A hollow-fiber membrane described in the above-described publication includes a filtration layer containing polytetrafluoroethylene as a main component. This filtration layer is formed by winding a porous sheet that contains polytetrafluoroethylene as a main component around the outer peripheral surface of a tubular support layer. In this filtration layer, a pore diameter on the outer peripheral surface side is substantially equal to a pore diameter on the inner peripheral surface side. Therefore, if the pore diameter of this filtration layer is increased in order to enhance water permeability, impurities easily permeate through the filtration layer. On the other hand, if the pore diameter of this filtration layer is decreased in order to enhance selectivity (property of preventing the permeation of impurities), water permeability decreases.

As described above, there is a trade-off between water permeability and selectivity in the existing hollow-fiber membrane that contains polytetrafluoroethylene as a main component.

The present disclosure has been made on the basis of the above circumstances. An object of the present disclosure is to provide a hollow-fiber membrane having both good water permeability and good selectivity.

Advantageous Effects of Present Disclosure

A hollow-fiber membrane according to an aspect of the present disclosure has both good water permeability and good selectivity.

DESCRIPTION OF EMBODIMENTS OF PRESENT DISCLOSURE

First, aspects of the present disclosure will be listed and described.

A hollow-fiber membrane according to an aspect of the present disclosure includes a porous, tubular filtration layer containing polytetrafluoroethylene as a main component and having a fibrous skeleton, in which a mean pore diameter in an outer peripheral surface of the filtration layer is smaller than a mean pore diameter in an inner peripheral surface of the filtration layer, and a ratio of the mean pore diameter in the inner peripheral surface of the filtration layer to the mean pore diameter in the outer peripheral surface of the filtration layer is 2.0 or more and 5.0 or less.

In the hollow-fiber membrane, since the ratio of the mean pore diameter in the inner peripheral surface to the mean pore diameter in the outer peripheral surface of the filtration layer containing polytetrafluoroethylene as a main component is within the above range, while permeation of impurities is sufficiently suppressed by the outer peripheral surface of the filtration layer, a flow path of filtered water that has permeated through this outer peripheral surface can be increased to reduce a pressure loss when the filtered water is discharged to the inside of the inner peripheral surface. Therefore, the hollow-fiber membrane has both good water permeability and good selectivity.

A difference between the mean pore diameter in the outer peripheral surface of the filtration layer and the mean pore diameter in the inner peripheral surface of the filtration layer is preferably 4 µm or more and 15 µm or less. When the difference between the mean pore diameter in the outer peripheral surface and the mean pore diameter in the inner peripheral surface is within the above range, water permeability and selectivity can be sufficiently enhanced.

A ratio of an average number of pores per unit area of the inner peripheral surface of the filtration layer to an average number of pores per unit area of the outer peripheral surface of the filtration layer is preferably 1.0 or more and 3.0 or less. When the ratio of the average number of pores per unit area of the inner peripheral surface to the average number of pores per unit area of the outer peripheral surface is within the above range, selectivity can be enhanced while sufficient water permeability is maintained.

When a region from the inner peripheral surface of the filtration layer to a depth of ½ of an average thickness of the filtration layer is defined as a first region, a ratio of a mean pore diameter in the first region to the mean pore diameter in the inner peripheral surface of the filtration layer is preferably 0.9 or more and 1.1 or less. When the ratio of the mean pore diameter in the first region to the mean pore diameter in the inner peripheral surface is within the above range, a pressure loss in this first region can be sufficiently reduced, and furthermore, water permeability of the hollow-fiber membrane can be further enhanced.

When a region from the outer peripheral surface of the filtration layer to a depth of 10 µm is defined as a second region, a ratio of a mean pore diameter in the second region to the mean pore diameter in the outer peripheral surface of the filtration layer is preferably 1.0 or more and 2.5 or less. When the ratio of the mean pore diameter in the second region to the mean pore diameter in the outer peripheral surface is within the above range, a flow path of filtered water that has permeated through the outer peripheral surface can be sufficiently increased to further enhance water permeability, while selectivity of the hollow-fiber membrane is enhanced.

When a region from the inner peripheral surface of the filtration layer to a depth of ½ of an average thickness of the filtration layer is defined as a first region, a region from the outer peripheral surface of the filtration layer to a depth of 10 µm is defined as a second region, and a region between the first region and the second region is defined as a third region, an average number of pores per unit area of the first region and an average number of pores per unit area of the third region are each preferably larger than an average number of pores per unit area of the second region, and a ratio of the average number of pores per unit area of the first region to the average number of pores per unit area of the third region is preferably 0.7 or more and 1.3 or less. With this configuration, a flow path of filtered water that has permeated through the outer peripheral surface can be sufficiently ensured to further enhance water permeability.

The hollow-fiber membrane is preferably formed of a single-layer body of the filtration layer. When the hollow-fiber membrane is formed of a single-layer body of the filtration layer, the thickness of the whole hollow-fiber membrane can be reduced, and water permeability is more easily enhanced. In addition, when the hollow-fiber membrane is formed of a single-layer body of the filtration layer, the production efficiency of the hollow-fiber membrane can be enhanced.

It should be noted that, in the present disclosure, the "main component" refers to a component that has the highest content on a mass basis and refers to a component that has a content of, for example, 50% by mass or more, preferably 70% by mass or more, and more preferably 95% by mass or more. The "pore diameter" refers to a diameter of a pore in the longitudinal direction. The "mean pore diameter" refers to a mean value of the pore diameter of 10 pores that are randomly selected. The "average number of pores per unit area" refers to an average value of the number of pores in five random observation areas of 100 µm×100 µm observed with a scanning electron microscope (SEM). The "average thickness" refers to an average value of thicknesses at 10 random points.

Details of Embodiments of Present Disclosure

Preferred embodiments of the present disclosure will be described below with reference to the drawings.

First Embodiment

<Hollow-Fiber Membrane>

Figure 2:
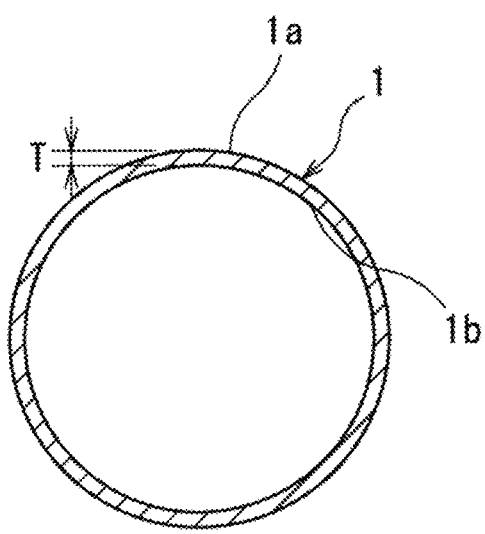
FIG. 2 is a sectional view of the hollow-fiber membrane taken along line A-A in FIG. 1.
Figure 3:
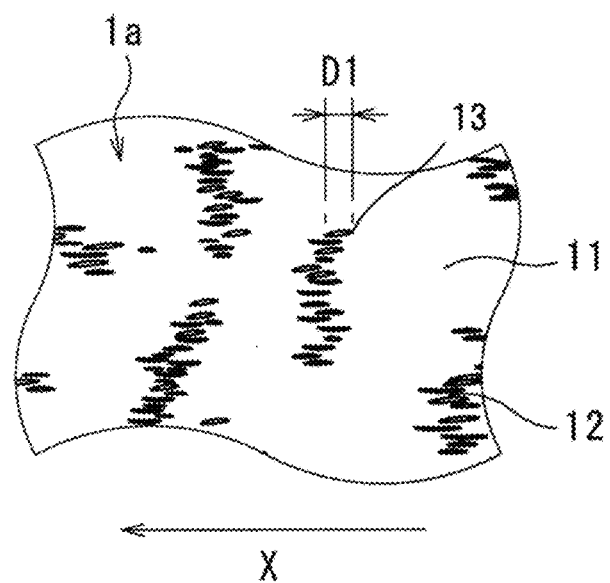
FIG. 3 is a partially enlarged schematic view of an outer peripheral surface of a filtration layer of the hollow-fiber membrane in FIG. 1.
Figure 4:
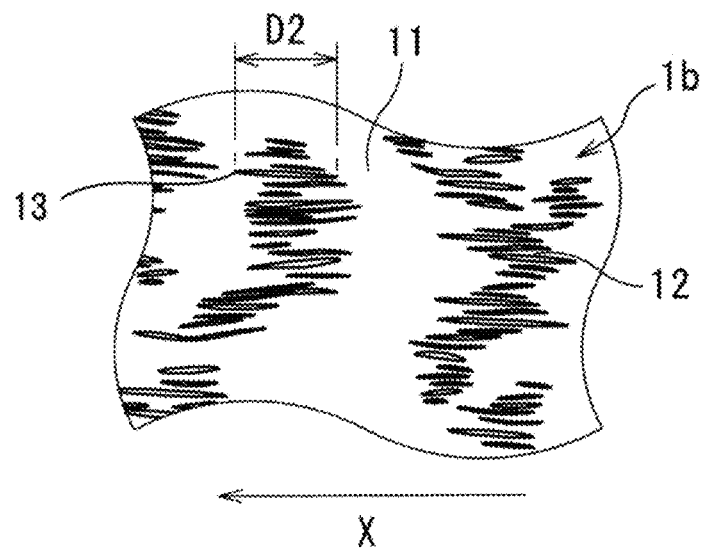
FIG. 4 is a partially enlarged schematic view of an inner peripheral surface of the filtration layer of the hollow-fiber membrane in FIG. 1.

A hollow-fiber membrane in FIGS. 1 and 2 includes a porous, tubular filtration layer 1 containing polytetrafluoroethylene (PTFE) as a main component and having a fibrous skeleton. In the hollow-fiber membrane, a mean pore diameter D1 of an outer peripheral surface 1*a* of the filtration layer 1 is smaller than a mean pore diameter D2 of an inner peripheral surface 1*b* of the filtration layer 1, as illustrated in FIGS. 3 and 4. In the hollow-fiber membrane, a ratio of the mean pore diameter D2 of the inner peripheral surface 1*b* to the mean pore diameter D1 of the outer peripheral surface 1*a* is 2.0 or more and 5.0 or less.

In the hollow-fiber membrane, filtration treatment is conducted by allowing filtered water to permeate into the inside of the inner peripheral surface 1*b*, while preventing impurities from permeating from an untreated liquid that is present on the outer peripheral surface 1*a* side of the filtration layer 1. The hollow-fiber membrane is suitably used in an external-pressure-type filtration apparatus in which filtered water is allowed to permeate into the inside of the inner peripheral surface 1*b* by increasing the pressure on the outer peripheral surface 1*a* side and an immersion-type (also referred to as a suction-type) filtration apparatus in which filtered water is allowed to permeate into the inside of the inner peripheral surface 1*b* by a negative pressure on the inner peripheral surface 1*b* side.

The hollow-fiber membrane includes the filtration layer 1 containing PTFE as a main component and thus is excellent in terms of, for example, mechanical strength, flexibility, and chemical resistance. In the hollow-fiber membrane, since the ratio of the mean pore diameter D2 of the inner peripheral surface 1*b* to the mean pore diameter D1 of the outer peripheral surface 1*a* of the filtration layer 1 containing PTFE as a main component is within the above range, while permeation of impurities is sufficiently suppressed by the outer peripheral surface 1*a* of the filtration layer 1, a flow path of filtered water that has permeated through this outer peripheral surface 1*a* can be increased to reduce a pressure loss when the filtered water is discharged toward the inner peripheral surface 1b. Therefore, the hollow-fiber membrane has both good water permeability and good selectivity. Furthermore, in the hollow-fiber membrane, since the outer peripheral surface 1a of the filtration layer 1 has a small pore diameter, impurities can be prevented from permeating into the fibrous skeleton of the filtration layer 1. Therefore, in the hollow-fiber membrane, a decrease in water permeability due to retention of impurities in the fibrous skeleton tends to be prevented.

The hollow-fiber membrane is formed of a single-layer body of the filtration layer 1. That is, the outer peripheral surface 1a of the filtration layer 1 constitutes the outer peripheral surface of the hollow-fiber membrane, and the inner peripheral surface 1b of the filtration layer 1 constitutes the inner peripheral surface of the hollow-fiber membrane. When the hollow-fiber membrane is formed of a single-layer body of the filtration layer 1, the thickness of the whole can be reduced, and water permeability is more easily enhanced. Furthermore, when the hollow-fiber membrane is formed of a single-layer body of the filtration layer 1, the production efficiency can be enhanced.

The lower limit of an average thickness T of the hollow-fiber membrane (that is, an average thickness of the filtration layer 1) is preferably 0.1 mm, and more preferably 0.2 mm. On the other hand, the upper limit of the average thickness T of the hollow-fiber membrane is preferably 5.0 mm, and more preferably 3.0 mm. If the average thickness T is less than the lower limit, the hollow-fiber membrane may have insufficient mechanical strength. Conversely, if the average thickness T exceeds the upper limit, it may become difficult to sufficiently enhance water permeability of the hollow-fiber membrane.

Figure 5:
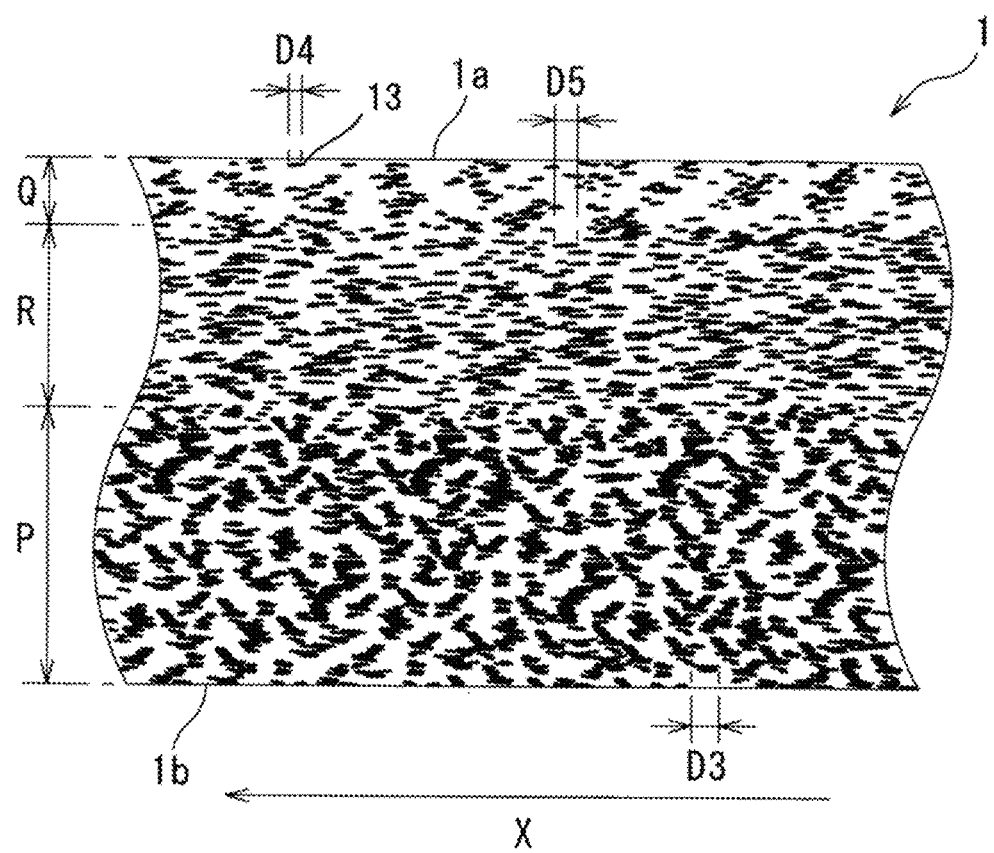
FIG. 5 is an enlarged sectional schematic view of the filtration layer of the hollow-fiber membrane in FIG. 1 in a thickness direction.

As described above, the filtration layer 1 has a fibrous skeleton. This fibrous skeleton has a three-dimensional mesh-like structure in which particle lumps called nodes 11 are connected together with fibrous portions called fibrils 12. The filtration layer 1 has pores 13 formed by gaps between the fibrils 12 or gaps between the nodes 11 and fibrils 12. In the filtration layer 1, a plurality of pores 13 communicate with each other in the thickness direction. These pores 13 are formed so as to have a three-dimensional mesh-like structure as illustrated in FIGS. 3 to 5.

The filtration layer 1 is a tubular body obtained by extrusion molding of a filtration layer-forming composition that contains PTFE. The filtration layer 1 is formed by being expanded in an axial direction (X-direction in FIG. 1) after extrusion. The expansion after extrusion enables mechanical strength of the filtration layer 1 to be enhanced. The expansion of the filtration layer 1 orients the plurality of fibrils 12 in the axial direction, and a plurality of pores 13 whose longitudinal direction is oriented in the axial direction are formed between the fibrils 12 and between the nodes 11 and the fibrils 12. Since the longitudinal direction of the plurality of pores 13 are oriented in the axial direction, the hollow-fiber membrane easily sends filtered water that has permeated through the pores 13 in the axial direction while reducing a pressure loss. The expansion ratio in the axial direction may be, for example, 50% or more and 700% or less. The filtration layer 1 may be formed by being expanded in a circumferential direction in addition to the axial direction after extrusion. The expansion ratio in the circumferential direction may be, for example, 5% or more and 100% or less. The size and the shape of the pores of the filtration layer 1 can be adjusted by adjusting expansion conditions such as the expansion temperature and the expansion ratio.

The plurality of pores 13 formed in the filtration layer 1 each have an elongated shape whose longitudinal direction is oriented in the axial direction. In addition, the filtration layer 1 has the smaller mean pore diameter D1 of the outer peripheral surface 1a than the mean pore diameter D2 of the inner peripheral surface 1b, as described above. In the hollow-fiber membrane, the mean pore diameter on the outer peripheral surface 1a side can be reduced as follows. When the filtration layer-forming composition is extruded from a die, friction is intentionally applied, by an inner peripheral surface of the die, to the filtration layer-forming composition that forms the outer peripheral surface 1a side of the filtration layer 1, as described below. More specifically, in the hollow-fiber membrane, fibrillation of this filtration layer-forming composition is considered to be accelerated by the friction that is intentionally applied to the filtration layer-forming composition that forms the outer peripheral surface 1a side of the filtration layer 1. Consequently, the gaps between the fibrils 12 adjacent to each other on the outer peripheral surface 1a side of the filtration layer 1 and the gaps between the nodes 11 and fibrils 12 adjacent to each other on the outer peripheral surface 1a side are considered to be decreased due to the increase in the number of fibrils 12. Thus, the mean pore diameter D1 of the outer peripheral surface 1a is considered to become smaller than the mean pore diameter D2 of the inner peripheral surface 1b.

The lower limit of the ratio of the mean pore diameter D2 of the inner peripheral surface 1b to the mean pore diameter D1 of the outer peripheral surface 1a of the filtration layer 1 is 2.0 as described above, preferably 2.5, and more preferably 3.0. On the other hand, the upper limit of the ratio is 5.0 as described above, preferably 4.5, and more preferably 4.0. If the ratio is less than the lower limit, it may become difficult to enhance both water permeability and selectivity. Conversely, if the ratio exceeds the upper limit, it may become difficult to form the filtration layer 1, or the mean pore diameter D2 of the inner peripheral surface 1b becomes excessively large and the filtration layer 1 may have insufficient strength on the inner peripheral surface 1b side.

The mean pore diameter D1 of the outer peripheral surface 1a of the filtration layer 1 can be set according to the use of the hollow-fiber membrane, and the lower limit of the mean pore diameter D1 is preferably 0.01 μm. On the other hand, the upper limit of the mean pore diameter D1 is preferably 10.0 μm, and more preferably 5.0 μm. If the mean pore diameter D1 is less than the lower limit, it may become difficult to sufficiently enhance water permeability of the filtration layer 1. Conversely, if the mean pore diameter D1 exceeds the upper limit, the mean pore diameter D2 of the inner peripheral surface 1b of the filtration layer 1 becomes excessively large and the filtration layer 1 may have insufficient strength on the inner peripheral surface 1b side.

The lower limit of a difference between the mean pore diameter D1 of the outer peripheral surface 1a of the filtration layer 1 and the mean pore diameter D2 of the inner peripheral surface 1b of the filtration layer 1 is preferably 4 μm, and more preferably 6 μm. On the other hand, the upper limit of the difference is preferably 15 μm, and more preferably 10 μm. If the difference is less than the lower limit, it may become difficult to enhance both water permeability and selectivity. Conversely, if the difference exceeds the upper limit, it may become difficult to form the filtration layer 1, or the mean pore diameter D2 of the inner peripheral surface 1b becomes excessively large and the strength on the inner peripheral surface 1b side may become insufficient.

The average number of pores per unit area of the inner peripheral surface 1b of the filtration layer 1 is preferably larger than the average number of pores per unit area of the outer peripheral surface $1a$ of the filtration layer 1. With this configuration, the flow path of filtered water that has passed through the outer peripheral surface $1a$ of the filtration layer 1 is ensured, and water permeability is easily enhanced. As described above, it is considered that, in the hollow-fiber membrane, when friction is intentionally applied to the filtration layer-forming composition that forms the outer peripheral surface $1a$ side of the filtration layer 1, fibrillation of this filtration layer-forming composition can be accelerated. It is also considered that, in the hollow-fiber membrane, when friction is intentionally applied to the filtration layer-forming composition that forms the outer peripheral surface $1a$ side of the filtration layer 1, fibrils that are adjacent to each other on the outer peripheral surface $1a$ side can be crushed and integrated together. With this configuration, in the hollow-fiber membrane, an increase in the number of pores due to fibrillation is suppressed and the number of pores in the outer peripheral surface $1a$ can be made relatively small, while the mean pore diameter D1 of the outer peripheral surface $1a$ of the filtration layer 1 is reduced.

The lower limit of a ratio of the average number of pores per unit area of the inner peripheral surface $1b$ of the filtration layer 1 to the average number of pores per unit area of the outer peripheral surface $1a$ of the filtration layer 1 is preferably 1.0, and more preferably 1.2. On the other hand, the upper limit of the ratio is preferably 3.0, and more preferably 2.0. If the ratio is less than the lower limit, a sufficient flow path of filtered water that has passed through the outer peripheral surface $1a$ of the filtration layer 1 cannot be ensured, and water permeability may not be sufficiently enhanced. Conversely, if the ratio exceeds the upper limit, the number of pores in the outer peripheral surface $1a$ becomes insufficient and it may become difficult to sufficiently enhance water permeability, or the number of pores in the inner peripheral surface $1b$ becomes excessively large and the strength on the inner peripheral surface $1b$ side may become insufficient.

The lower limit of the average number of pores per unit area of the outer peripheral surface $1a$ of the filtration layer 1 is preferably 20 pores/2,500 $\mu m^2$, and more preferably 30 pores/2,500 $\mu m^2$. On the other hand, the upper limit of the average number of pores is preferably 100 pores/2,500 $\mu m^2$, and more preferably 70 pores/2,500 $\mu m^2$. If the average number of pores is less than the lower limit, it may become difficult to sufficiently enhance water permeability. Conversely, if the average number of pores exceeds the upper limit, the pore-diameter control performed by applying friction to the filtration layer-forming composition may become insufficient, or the number of pores in the inner peripheral surface $1b$ becomes excessively large and the strength on the inner peripheral surface $1b$ side may become insufficient.

The changes in the pore diameter and the number of pores in the thickness direction of the filtration layer 1 will be described with reference to FIG. 5. As described above, the filtration layer 1 has a small mean pore diameter and a relatively small number of pores on the outer peripheral surface $1a$ side. In contrast, on the inner peripheral surface $1b$ side of the filtration layer 1 (for example, in a region inside an intermediate position of the filtration layer 1 in the thickness direction), fibrillation of the filtration layer-forming composition is not accelerated during the formation of the filtration layer 1, and thus the mean pore diameter on the inner peripheral surface $1b$ side is larger than that on the outer peripheral surface $1a$ side. In addition, since the filtration layer-forming composition that forms the inner peripheral surface side of the filtration layer 1 is not subjected to the intentional application of friction during the formation of the filtration layer 1, an increase or decrease in the number of pores due to friction hardly occurs. Furthermore, in the region sandwiched between the outer peripheral surface $1a$ side and the inner peripheral surface $1b$ side of the filtration layer 1, while the mean pore diameter tends to become slightly smaller than that of the inner peripheral surface $1b$ side due to the influence of fibrillation of the filtration layer-forming composition on the outer peripheral surface $1a$ side, the sandwiched region is less susceptible to the influence of crushing of fibrils adjacent to each other, and the decrease in the number of pores is suppressed.

Hereinafter, a region from the inner peripheral surface $1b$ of the filtration layer 1 to a depth of ½ of an average thickness T of the filtration layer 1 is defined as a first region P, a region from the outer peripheral surface $1a$ to a depth of 10 μm is defined as a second region Q, and a region between the first region P and the second region Q is defined as a third region R. The mean pore diameter and the number of pores of the inside of the filtration layer 1 will now be described. It should be noted that the pores in the first region P, the second region Q, and the third region R are each oriented in the axial direction of the filtration layer 1.

The mean pore diameter D2 of the inner peripheral surface $1b$ of the filtration layer 1 is substantially equal to a mean pore diameter D3 of the first region P. The lower limit of a ratio of the mean pore diameter D3 of the first region P to the mean pore diameter D2 of the inner peripheral surface $1b$ of the filtration layer 1 is preferably 0.9, and more preferably 0.95. On the other hand, the upper limit of the ratio is preferably 1.1, and more preferably 1.05. If the ratio is less than the lower limit, the flow path of filtered water cannot be sufficiently increased inside the filtration layer 1, and water permeability may not be sufficiently enhanced. Conversely, if the ratio exceeds the upper limit, the flow path becomes excessively narrow in the direction in which filtered water permeates, and consequently, pressure loss may increase. The mean pore diameter in the first region P and the mean pore diameters in the second region Q and the third region R described later can each be determined by a mean value of the pore diameter of 10 pores that are randomly selected from a SEM image of a section of the filtration layer 1 in the thickness direction.

The average number of pores per unit area of the inner peripheral surface $1b$ of the filtration layer 1 is substantially equal to the average number of pores per unit area of the first region P. The lower limit a ratio of the average number of pores per unit area of the first region P to the average number of pores per unit area of the inner peripheral surface $1b$ is preferably 0.9, and more preferably 0.95. On the other hand, the upper limit of the ratio is preferably 1.1, and more preferably 1.05. If the ratio is less than the lower limit, the flow path of filtered water cannot be sufficiently ensured inside the filtration layer 1, and water permeability may not be sufficiently enhanced. Conversely, if the ratio exceeds the upper limit, the flow path is reduced in the direction in which filtered water permeates, and consequently, pressure loss may increase. The average number of pores of the first region P and the average numbers of pores of the second region Q and the third region R described later can each be determined by an average value of the number of pores in five random observation areas of 100 μm×100 μm of a section of the filtration layer 1 in the thickness direction, the observation areas being observed with a SEM.

The second region Q ensures a flow path of filtered water that has permeated through the outer peripheral surface $1a$.

The lower limit a ratio of a mean pore diameter D4 of the second region Q to the mean pore diameter D1 of the outer peripheral surface 1a of the filtration layer 1 is preferably 1.0, and more preferably 1.2. On the other hand, the upper limit of the ratio is preferably 2.5, and more preferably 2.0. If the ratio is less than the lower limit, the flow path becomes narrow in the direction in which filtered water permeates, and consequently, pressure loss may increase. Conversely, if the ratio exceeds the upper limit, it becomes difficult to control the pore diameter, and relatively large pores may be partially formed on the outer peripheral surface 1a.

The average number of pores per unit area of the outer peripheral surface 1a of the filtration layer 1 is substantially equal to the average number of pores per unit area of the second region Q. The lower limit a ratio of the average number of pores per unit area of the second region Q to the average number of pores per unit area of the outer peripheral surface 1a is preferably 0.9, and more preferably 0.95. If the ratio is less than the lower limit, the flow path is reduced in the direction in which filtered water permeates, and consequently, pressure loss may increase. On the other hand, there is no particular limitation on the upper limit of the ratio. From the viewpoint of facilitating the production of the filtration layer 1, the upper limit of the ratio is preferably 1.1, and more preferably 1.05.

A mean pore diameter D5 of the third region R is smaller than the mean pore diameter D2 of the inner peripheral surface 1b of the filtration layer 1. In the hollow-fiber membrane, since the mean pore diameter D5 of the third region R is smaller than the mean pore diameter D2 of the inner peripheral surface 1b, the flow path can be increased from the third region R toward the inner peripheral surface 1b in the direction in which filtered water permeates, and water permeability can be enhanced.

The mean pore diameter D5 of the third region R is preferably larger than the mean pore diameter D1 of the outer peripheral surface 1a of the filtration layer 1. The lower limit of a ratio of the mean pore diameter D5 of the third region R to the mean pore diameter D1 of the outer peripheral surface 1a of the filtration layer 1 is preferably 1.5, and more preferably 2.0. On the other hand, the upper limit of the ratio is preferably 3.5, and more preferably 3.0. If the ratio is less than the lower limit, the flow path of filtered water may not be sufficiently increased from the outer peripheral surface 1a toward the third region R, and pressure loss may not be sufficiently reduced. Conversely, if the ratio exceeds the upper limit, it may become difficult to produce the filtration layer 1.

The mean pore diameter of the filtration layer 1 preferably becomes larger in the order of the outer peripheral surface 1a, the second region Q, the third region R, and the first region P. With this configuration, the flow path of filtered water that has permeated through the outer peripheral surface 1a can be increased in the permeation direction to thereby enhance water permeability.

The average number of pores per unit area of the first region P is larger than the average number of pores per unit area of the second region Q. In addition, the average number of pores per unit area of the third region R is larger than the average number of pores per unit area of the second region Q. In the hollow-fiber membrane, since the average numbers of pores per unit area of the first region P and the third region R are each larger than the average number of pores per unit area of the second region Q, the flow path of filtered water that has permeated through the outer peripheral surface 1a can be sufficiently ensured to enhance water permeability.

The lower limit of a ratio of the average number of pores per unit area of the first region P to the average number of pores per unit area of the second region Q and the lower limit of a ratio of the average number of pores per unit area of the third region R to the average number of pores per unit area of the second region Q are each preferably 1.2, and more preferably 1.4. On the other hand, the upper limit of each of the ratios is preferably 2.5, and more preferably 2.0. If the ratio is less than the lower limit, water permeability may not be sufficiently enhanced. Conversely, if the ratio exceeds the upper limit, it may become difficult to produce the filtration layer 1.

The average number of pores per unit area of the first region P is substantially equal to the average number of pores per unit area of the third region R. The lower limit of a ratio of the average number of pores per unit area of the first region P to the average number of pores per unit area of the third region R is preferably 0.7, and more preferably 0.8. On the other hand, the upper limit of the ratio is preferably 1.3, and more preferably 1.2. If the ratio is less than the lower limit, the flow path is reduced in the direction in which filtered water permeates, and consequently, pressure loss may increase. Conversely, if the ratio exceeds the upper limit, the filtration layer 1 may have insufficient strength on the inner peripheral surface 1b side, or it may become difficult to produce the filtration layer 1.

The filtration layer 1 may contain, in addition to PTFE, other fluororesins and additives within a range that does not impair the desired advantages of the present disclosure. Examples of the additives include pigments for coloring and inorganic fillers, metal powders, metal oxide powders, and metal sulfide powders for improving wear resistance, preventing cold flow, or facilitating formation of pores.

<Method for Producing Hollow-Fiber Membrane>

Figure 6:
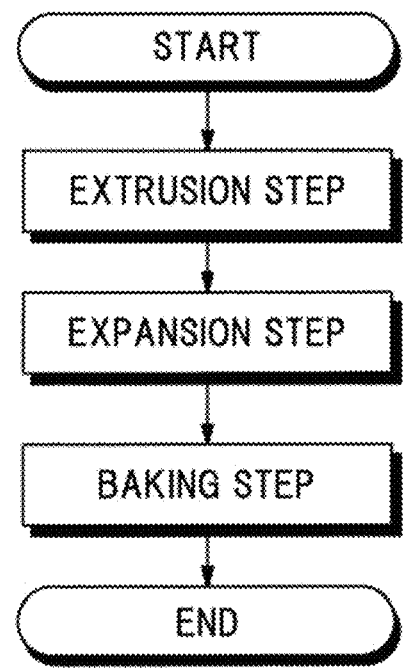
FIG. 6 is a flowchart showing a method for producing the hollow-fiber membrane in FIG. 1.

Next, a method for producing the hollow-fiber membrane in FIG. 1 will be described with reference to FIGS. 6 and 7. The method for producing a hollow-fiber membrane includes a step of extruding a filtration layer-forming composition that contains a powdery PTFE as a main component into a tubular shape, a step of expanding an extruded body extruded in the extrusion step in an axial direction, and a step of baking the extruded body after expansion in the expansion step. In the method for producing the hollow-fiber membrane, the mean pore diameter in the outer peripheral surface of the extruded body after the expansion step is smaller than the mean pore diameter in the inner peripheral surface of the extruded body. A ratio of the mean pore diameter in the inner peripheral surface of the extruded body to the mean pore diameter in the outer peripheral surface is 2.0 or more and 5.0 or less.

The method for producing a hollow-fiber membrane is capable of easily producing the hollow-fiber membrane in FIG. 1, the hollow-fiber membrane having both good water permeability and good selectivity.

(Extrusion Step)

In the extrusion step, a cylindrical compression-molded body composed of a filtration layer-forming composition that contains a powdery PTFE as a main component is extruded into a tubular shape. The extrusion step is conducted at a temperature lower than the melting point of the PTFE and typically conducted at room temperature. The filtration layer-forming composition may be a composition obtained by blending a liquid lubricant with a powdery PTFE. Various lubricants that have been used to date in a paste extrusion method can be used as the liquid lubricant. Examples of the liquid lubricant include petroleum solvents such as naphtha and white oil; hydrocarbon oils such as undecane; aromatic hydrocarbons such as toluene and xylene; alcohols; ketones; esters; silicone oils; fluorochlorocarbon oils; solutions obtained by dissolving a polymer such as polyisobutylene or polyisoprene in any of these solvents; mixtures of two or more of these; and water or aqueous solutions containing a surfactant. The liquid lubricant used is preferably composed of a single component from the viewpoint of the ease of uniform mixing.

Figure 7:
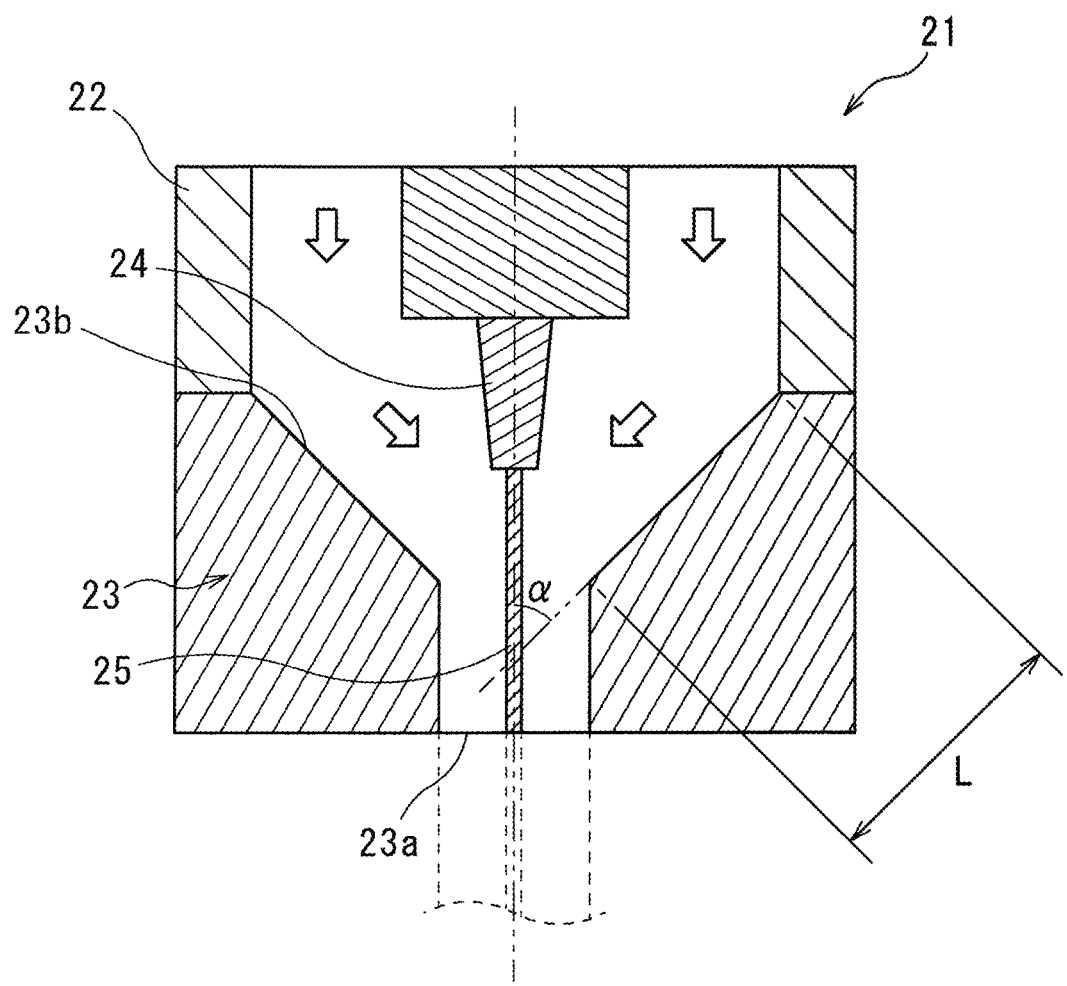
FIG. 7 is a schematic view illustrating an apparatus for forming an extruded body in the method for producing the hollow-fiber membrane, the method being shown in FIG. 6.

The extrusion step can be conducted by using an extruder 21 in FIG. 7. The extruder 21 includes a cylinder 22 having a columnar internal space, a die 23 that has an internal space communicating with the internal space of the cylinder 22 and that is disposed so as to continuously extend from an end face of the cylinder 22 on the side in the extrusion direction, a mandrel 24 disposed in the internal space of the cylinder 22, and a core pin 25 that projects from an end face of the mandrel 24 on the side in the extrusion direction and that is disposed on a central axis of the internal spaces of the cylinder 22 and the die 23. The die 23 has, at an end on the side in the extrusion direction, an opening 23a communicating with the internal space of the cylinder 22. The center of the opening 23a is located on the central axis of the internal spaces of the cylinder 22 and the die 23. An inclined surface 23b that continuously extends from the inner peripheral surface of the cylinder 22 and that tapers toward the side in the extrusion direction is formed on the inner peripheral surface of the die 23.

In the extrusion step, friction applied to the filtration layer-forming composition that forms the outer peripheral surface 1a side of the filtration layer 1 is adjusted by adjusting an angle α of inclination of the inclined surface 23b with respect to the central axis of the cylinder 22 and the die 23 and a length L of the inclined surface 23b in the direction of inclination. Thus, the method for producing the hollow-fiber membrane is capable of controlling the mean pore diameter D1 of the outer peripheral surface 1a of the filtration layer 1, the average number of pores per unit area, and the like to the ranges described above.

The lower limit of the angle α of inclination of the inclined surface 23b is preferably 30°, and more preferably 31°. If the angle α of inclination is less than the lower limit, friction to the filtration layer-forming composition that forms the outer peripheral surface 1a side of the filtration layer 1 becomes insufficient, and the mean pore diameter D1 of the outer peripheral surface 1a of the filtration layer 1 may not be sufficiently reduced. On the other hand, the upper limit of the angle α of inclination can be set according to the desired pore diameter in the outer peripheral surface 1a and is preferably 90°, more preferably 60°, and still more preferably 40°.

The lower limit of the length L of the inclined surface 23b in the direction of inclination is preferably 30 mm, and more preferably 35 mm. On the other hand, the upper limit of the length L in the direction of inclination is preferably 50 mm, and more preferably 45 mm. If the length L in the direction of inclination is less than the lower limit, friction to the filtration layer-forming composition that forms the outer peripheral surface side of the filtration layer 1 becomes insufficient, and the mean pore diameter D1 of the outer peripheral surface 1a of the filtration layer 1 may not be sufficiently reduced. Conversely, if the length L in the direction of inclination exceeds the upper limit, it may become difficult to control the mean pore diameter and the average number of pores per unit area of the outer peripheral surface 1a of the filtration layer 1.

(Expansion Step)

In the expansion step, the tubular extruded body extruded in the extrusion step is expanded in the axial direction under heating. The expansion step can be conducted by taking up the extruded body extruded from the die 23 under heating at a speed higher than the speed at which the extruded body is extruded from the die 23. As a result, the liquid lubricant in the extruded body is volatilized, and the extruded body can be made porous.

The lower limit of the expansion ratio of the extruded body in the expansion step is preferably 50%, and more preferably 100%. On the other hand, the upper limit of the expansion ratio is preferably 700%, and more preferably 400%. If the expansion ratio is less than the lower limit, the difference between the mean pore diameter D1 of the outer peripheral surface 1a and the mean pore diameter D2 of the inner peripheral surface 1b of the resulting filtration layer 1 may not be sufficiently increased. Conversely, if the expansion ratio exceeds the upper limit, the extruded body may tear.

(Baking Step)

In the baking step, the extruded body after the expansion step is heated to a temperature equal to or higher than the melting point of PTFE, while the length of the extruded body is maintained, and is fixed in the expanded state.

The heating temperature in the baking step may be, for example, 350° C. or higher and 550° C. or lower. The heating time in the baking step may be, for example, 10 seconds or more and 20 minutes or less.

In the method for producing a hollow-fiber membrane, the extruded body after the baking step constitutes the filtration layer 1. The method for producing a hollow-fiber membrane may further include a step of cutting the extruded body after the baking step to have a desired dimension.

Other Embodiments

It is to be understood that the embodiments disclosed herein are only illustrative and non-restrictive in all respects. The scope of the present invention is not limited to the configurations of the embodiments but is defined by the appended claims. The scope of the present invention is intended to cover all changes within the meaning and scope equivalent to those of the claims.

For example, the hollow-fiber membrane is preferably formed of a single-layer body of the filtration layer from the viewpoint of, for example, easily and reliably controlling water permeability and selectivity of the whole membrane. However, the hollow-fiber membrane may have a layer other than the filtration layer.

In the hollow-fiber membrane, the mean pore diameters and the average numbers of pores per unit area of the first region P to the third region R may not be necessarily controlled to satisfy the relations of the first embodiment.

EXAMPLE

The present disclosure will be more specifically described below on the basis of Example. However, the present disclosure is not limited to the Example.

Example

[No. 1]

A cylindrical compression-molded body that contained, as a main component, a PTFE fine powder ("F104" manufactured by Daikin Industries, Ltd.) and, as a liquid lubricant, "Supasol FP-25" manufactured by Idemitsu Kosan Co., Ltd.

and containing naphtha as a component was extruded into a tubular shape by using the extruder 21 in FIG. 7 under the conditions described below (Extrusion step).

Figure 8:
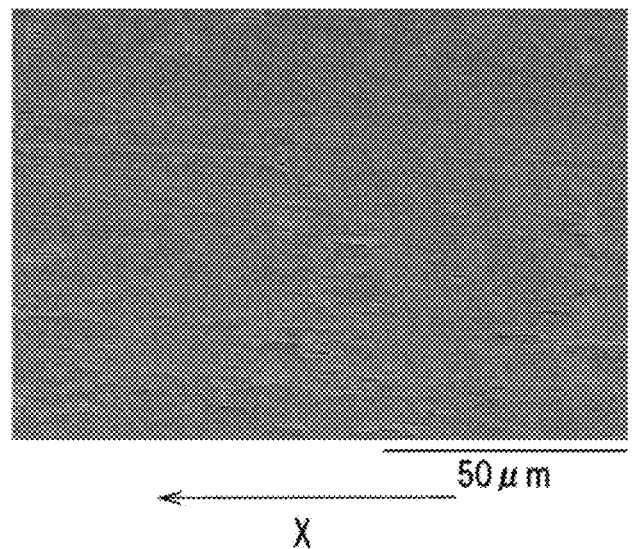
FIG. 8 is a SEM image of an outer peripheral surface of a filtration layer of a hollow-fiber membrane of No. 1.

Cylinder diameter (inner diameter): 50 mm
Mandrel diameter: 24.6 mm
Die diameter (opening diameter): 2.4 mm
Core pin diameter: 1.5 mm
Reduction ratio (a ratio of the cross-sectional area of the cylindrical compression-molded body to the area of the gap between the core pin and the inner peripheral surface of the die at the opening of the die): 540
Ram speed: 11 mm/min
Angle of inclination of inclined surface of die: 32°
Length of inclined surface of die in direction of inclination: 34.8 mm The tubular extruded body extruded in the extrusion step was expanded in the axial direction at a heating temperature of 230° C. for a heating time of 1 minute at an expansion ratio of 150% (Expansion step), and the extruded body after expansion was baked at a heating temperature of 365° C. for a heating time of 6 minutes while the length of the extruded body was maintained (Baking step) to produce a hollow-fiber membrane of No. 1, the hollow-fiber membrane being formed of a single-layer body of a filtration layer having an average thickness of 0.3 mm. FIG. 8 shows a SEM image of the outer peripheral surface of the hollow-fiber membrane, FIG. 9 shows a SEM image of the inner peripheral surface of the hollow-fiber membrane, and FIG. 10 shows a SEM image of a section of the hollow-fiber membrane in the thickness direction.

Figure 9:
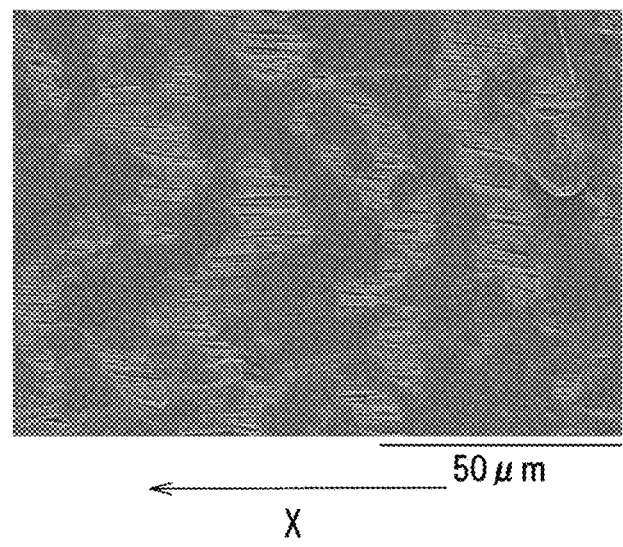
FIG. 9 is a SEM image of an inner peripheral surface of the filtration layer of the hollow-fiber membrane of No. 1.
Figure 10:
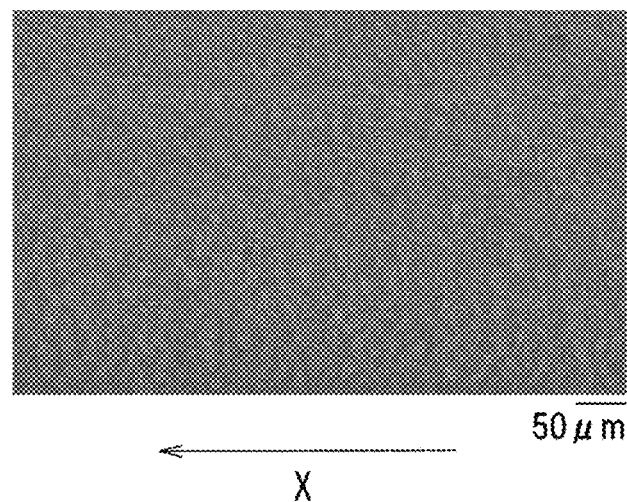
FIG. 10 is a SEM image of a section of the filtration layer of the hollow-fiber membrane of No. 1 in a thickness direction. In the SEM image, the upper side corresponds to the outer peripheral surface of the filtration layer, and the lower side corresponds to the inner peripheral surface of the filtration layer.

As shown in FIGS. 8 and 9, the mean pore diameter in the outer peripheral surface of this filtration layer is smaller than the mean pore diameter in the inner peripheral surface. The mean pore diameter in the outer peripheral surface of this filtration layer was 3 μm, the mean pore diameter in the inner peripheral surface was 10 μm, and the ratio of the mean pore diameter in the inner peripheral surface to the mean pore diameter in the outer peripheral surface was 3.3. The average number of pores per unit area of the outer peripheral surface of this filtration layer was 50 pores/2,500 μm$^2$, and the average number of pores per unit area of the inner peripheral surface was 70 pores/2,500 μm$^2$.

In this filtration layer, when a region from the inner peripheral surface to a depth of ½ of the average thickness of the filtration layer was defined as a first region, a region from the outer peripheral surface to a depth of 10 μm was defined as a second region, and a region between the first region and the second region was defined as a third region, the first region had a mean pore diameter of 10 μm, the second region had a mean pore diameter of 5 μm, and the third region had a mean pore diameter of 8 μm. The average number of pores per unit area of the first region was 70 pores/2,500 μm$^2$, the average number of pores per unit area of the second region was 50 pores/2,500 μm$^2$, and the average number of pores per unit area of the third region was 80 pores/2,500 μm$^2$.

(IPA Bubble Point)

The IPA bubble point of the hollow-fiber membrane of No. 1 was measured by using isopropyl alcohol in accordance with ASTM F316. The IPA bubble point was 104 kPa.

(Gurley Seconds)

The Gurley seconds of the hollow-fiber membrane of No. 1 were measured in accordance with JIS-P8117:2009 in terms of the time taken for 100 cm$^3$ of air to permeate through a laminate with an area of 6.45 cm$^2$ at an average pressure difference of 1.22 kPa. The Gurley seconds were 107 seconds.

The above measurement results show that the hollow-fiber membrane of No. 1 has both good water permeability and good selectivity.

| Reference Signs List | | | |
|---|---|---|---|
| 1 filtration layer | 1a outer peripheral surface | 1b inner peripheral surface | |
| 11 node | 12 fibril | 13 pore | |
| 21 extruder | 22 cylinder | 23 die | |
| 23a opening | 23b inclined surface | 24 mandrel | 25 core pin |
| P first region | Q second region | R third region | |

The invention claimed is:

1. A hollow-fiber membrane comprising a porous, tubular filtration layer containing polytetrafluoroethylene as a main component and having a fibrous skeleton,
   wherein a mean pore diameter in an outermost peripheral surface of the filtration layer is smaller than a mean pore diameter in an innermost peripheral surface of the filtration layer,
   a ratio of the mean pore diameter in the innermost peripheral surface of the filtration layer to the mean pore diameter in the outermost peripheral surface of the filtration layer is 2.0 to 5.0,
   a ratio of an average number of pores per unit area of the innermost peripheral surface of the filtration layer to an average number of pores per unit area of the outermost peripheral surface of the filtration layer is 1.2 to 3.0, and
   when a region from the innermost peripheral surface of the filtration layer to a depth of ½ of an average thickness of the filtration layer is defined as a first region, a region from the outermost peripheral surface of the filtration layer to a depth of 10 μm is defined as a second region, and a region between the first region and the second region is defined as a third region, an average number of pores per unit area of the first region is larger than an average number of pores per unit area of the second region, and an average number of pores per unit area of the third region is larger than the average number of pores per unit area of the second region.

2. The hollow-fiber membrane according to claim 1, wherein a difference between the mean pore diameter in the outermost peripheral surface of the filtration layer and the mean pore diameter in the innermost peripheral surface of the filtration layer is 4 μm to 15 μm.

3. The hollow-fiber membrane according to claim 1, wherein when a region from the innermost peripheral surface of the filtration layer to a depth of ½ of an average thickness of the filtration layer is defined as a first region, a ratio of a mean pore diameter in the first region to the mean pore diameter in the innermost peripheral surface of the filtration layer is 0.9 to 1.1.

4. The hollow-fiber membrane according to claim 1, wherein when a region from the outermost peripheral surface of the filtration layer to a depth of 10 μm is defined as a second region, a ratio of a mean pore diameter in the second region to the mean pore diameter in the outermost peripheral surface of the filtration layer is 1.0 to 2.5.

5. The hollow-fiber membrane according to claim 1, wherein a ratio of the average number of pores per unit area of the first region to the average number of pores per unit area of the third region is 0.7 to 1.3.

6. The hollow-fiber membrane according to claim 1, wherein the hollow-fiber membrane is formed of a single-layer body of the filtration layer.

* * * * *